US012573638B2

(12) United States Patent
Song et al.

(10) Patent No.: US 12,573,638 B2
(45) Date of Patent: Mar. 10, 2026

(54) ANODE FOR A LITHIUM SECONDARY BATTERY WITH AN INTERFACIAL LAYER MADE OF PHOSPHOROUS-DOPED GRAPHITIC CARBON NITRIDE AND A SINGLE ION CONDUCTING POLYMER, A LITHIUM SECONDARY BATTERY, AND A MANUFACTURING METHOD THEREOF

(71) Applicants: HYUNDAI MOTOR COMPANY, Seoul (KR); KIA CORPORATION, Seoul (KR); Korea Advanced Institute of Science and Technology, Daejeon (KR)

(72) Inventors: Jong Chan Song, Uiwang-si (KR); Jae Wook Shin, Uiwang-si (KR); Seong Min Ha, Uiwang-si (KR); Seung Jong Lee, Uiwang-si (KR); Won Keun Kim, Uiwang-si (KR); Kyoung Han Ryu, Uiwang-si (KR); Hee Tak Kim, Daejeon (KR); Young Il Roh, Daejeon (KR)

(73) Assignees: HYUNDAI MOTOR COMPANY, Seoul (KR); KIA CORPORATION, Seoul (KR); Korea Advanced Institute of Science and Technology, Daejeon (KR)

( * ) Notice: Subject to any disclaimer, the term of this patent is extended or adjusted under 35 U.S.C. 154(b) by 627 days.

(21) Appl. No.: 17/898,716

(22) Filed: Aug. 30, 2022

(65) Prior Publication Data

US 2023/0094962 A1 Mar. 30, 2023

(30) Foreign Application Priority Data

Aug. 31, 2021 (KR) ........................ 10-2021-0115191

(51) Int. Cl.
*H01M 4/62* (2006.01)
*C01B 21/06* (2006.01)
(Continued)

(52) U.S. Cl.
CPC ......... *H01M 4/628* (2013.01); *C01B 21/0605* (2013.01); *C08K 3/32* (2013.01);
(Continued)

(58) Field of Classification Search
CPC .... H01M 4/628; H01M 4/134; H01M 4/1395; H01M 4/62; H01M 10/0525;
(Continued)

(56) References Cited

U.S. PATENT DOCUMENTS

| | | | |
|---|---|---|---|
| 9,856,341 | B2 | 1/2018 | Lee et al. |
| 2016/0190641 | A1 | 6/2016 | Lee et al. |

(Continued)

FOREIGN PATENT DOCUMENTS

| | | | |
|---|---|---|---|
| CN | 111740076 | A | 10/2020 |
| KR | 101486130 | B1 | 1/2015 |

(Continued)

OTHER PUBLICATIONS

Qiu et al. (Year: 2021) (In-situ Synthesis of N, O, P-Doped Hierarchical Porous Carbon from Poly-bis(penoxy)phosphazene for polysulfide-trapping interlayer in lithium-sulfur batteries, Apr. 2021, Chemistry Europe: European Chemical Societies Publishing).*

(Continued)

*Primary Examiner* — Milton I Cano
*Assistant Examiner* — Katherine J Metzger
(74) *Attorney, Agent, or Firm* — Lempia Summerfield Katz LLC

(57) ABSTRACT

Disclosed are an anode for a lithium secondary battery, a lithium secondary battery including the anode, and a manufacturing method thereof. In particular, the anode includes a
(Continued)

lithium metal layer and an interfacial layer made of phosphorous-doped graphitic carbon nitride and a single ion conducting polymer.

5 Claims, 8 Drawing Sheets

(51) Int. Cl.

| | |
|---|---|
| ***C08K 3/32*** | (2006.01) |
| ***H01M 4/134*** | (2010.01) |
| ***H01M 4/1395*** | (2010.01) |
| ***H01M 10/052*** | (2010.01) |
| ***H01M 10/0525*** | (2010.01) |
| *C08K 3/28* | (2006.01) |
| *H01M 4/02* | (2006.01) |

(52) U.S. Cl.
CPC ......... *H01M 4/134* (2013.01); *H01M 4/1395* (2013.01); *H01M 10/052* (2013.01); *H01M 10/0525* (2013.01); *C08K 3/28* (2013.01); *H01M 2004/021* (2013.01); *Y02E 60/10* (2013.01)

(58) Field of Classification Search
CPC ....... H01M 10/0569; H01M 2004/021; H01M 2004/027; C01B 21/0605; C08K 3/32; C08K 3/28; Y02E 60/10
See application file for complete search history.

(56) References Cited

U.S. PATENT DOCUMENTS

| | | | | |
|---|---|---|---|---|
| 2019/0140322 | A1 * | 5/2019 | Ren ....................... | H01M 4/134 |
| 2020/0243919 | A1 | 7/2020 | Yoon et al. | |
| 2020/0274124 | A1 * | 8/2020 | Thielen .................. | C08F 12/30 |
| 2021/0344006 | A1 | 11/2021 | Yoon et al. | |

FOREIGN PATENT DOCUMENTS

| | | | |
|---|---|---|---|
| KR | 20160079574 | A | 7/2016 |
| KR | 20190101742 | A | 9/2019 |
| KR | 20190129767 | A | 11/2019 |
| KR | 20190141392 | A | 12/2019 |
| KR | 20210009188 | A | 1/2021 |
| KR | 20210092928 | A | 7/2021 |

OTHER PUBLICATIONS

Luan, Xiaoyu et al., "Stable Lithium Deposition Enabled by an Acid-Treated g-C N Interface Layer for a Lithium Metal Anode," ACS Appl Mater Interfaces. 12(9) (2020). https://doi.org/10.1021/acsami.9b23520.

Y. Huang et al., "Graphitic Carbon Nitride (g-C N ): An Interface Enabler for Solid-State Lithium Metal Batteries," Angew. Chem. Int. Ed., vol. 59, Issue 3699 (2020). pp. 17. https://onlinelibrary.wiley.com/doi/full/10.1002/anie.201914417.

Zhang, X et al. "Effect of phosphorous-doped graphitic carbon nitride on electrochemical properties of lithium-sulfur battery," Ionics 26, 5491-5501 (2020). pp. 44. https://doi.org/10.1007/s11581-020-03728-w.

* cited by examiner

ANODE FOR A LITHIUM SECONDARY BATTERY WITH AN INTERFACIAL LAYER MADE OF PHOSPHOROUS-DOPED GRAPHITIC CARBON NITRIDE AND A SINGLE ION CONDUCTING POLYMER, A LITHIUM SECONDARY BATTERY, AND A MANUFACTURING METHOD THEREOF

CROSS-REFERENCE TO RELATED APPLICATION

This application claims under 35 U.S.C. § 119(a) the benefit of and priority to Korean Patent Application No. 10-2021-0115191 filed on Aug. 31, 2021, the entire contents of which are incorporated herein by reference.

BACKGROUND

(a) Technical Field

The present disclosure relates to an anode for a lithium secondary battery, the anode including an interfacial layer made of phosphorous-doped graphitic carbon nitride and a single ion conducting polymer. The disclosure further relates to a lithium secondary battery including the anode, and a manufacturing method thereof.

(b) Background

The statements in this section merely provide background information related to the present disclosure and may not constitute prior art.

Batteries using an anode including a lithium metal are in the spotlight as a next-generation lithium secondary battery with high capacity and high energy. A lithium metal battery, a lithium sulfur battery, and a lithium air battery are possible.

Because lithium metal used as an anode has a low density (0.54 $g \cdot cm^{-3}$) and a low standard reduction potential (−3.040 V vs. SHE), high theoretical capacity (3,860 mAh/g) and high energy density per volume and weight can be realized. However, the lithium metal battery has major problems such as lithium dendrite growth and low coulombic efficiency.

During the electrochemical operating of the battery, lithium dendrites and dead lithium are formed on the lithium metal anode to cause loss of active material. Because lithium metal has high reactivity, the lithium metal reacts with an electrolyte and residual moisture to form a solid electrolyte interphase (SEI) on its surface. Due to the increase in the surface area of the electrode by the formation of dendrites and dead lithium, a process in which the SEI is broken and formed again is repeated. Therefore, lithium metal and electrolyte are continuously consumed, which affects the low coulombic efficiency and short cycle life.

Further, when lithium dendrites grow by breaking through a separator, an internal short circuit may occur to cause safety problems such as fire and explosion. Therefore, in order to realize a high-performance and high-safety lithium metal battery, a strategy to inhibit lithium dendrite growth and induce uniform lithium electrodeposition is essential.

SUMMARY OF THE DISCLOSURE

An object of the present disclosure is to provide an anode for a lithium secondary battery, including an interfacial layer that can induce lithium to uniformly form nuclei and grow in the plane direction during charging of the battery.

Another object of the present disclosure is to provide an anode for a lithium secondary battery, including an interfacial layer which has a high lithium-ion transport rate and can suppress electrolyte depletion.

The objects of the present disclosure are not limited to the objects mentioned above. The objects of the present disclosure become clearer from the following description, and are realized by means and combinations thereof described in the claims.

An anode for a lithium secondary battery according to an embodiment of the present disclosure may include a lithium metal layer and an interfacial layer disposed on the lithium metal layer, wherein the interfacial layer may include phosphorous-doped graphitic carbon nitride and a single ion conducting polymer represented by Chemical Formula 1 below.

[Chemical Formula 1]

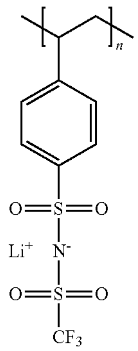
, wherein n is an integer in a range of 10 to 100,000.

The phosphorous-doped graphitic carbon nitride may have an element concentration of phosphorous element (P) in a range of about 0.1% by atom to 10% by atom.

The interfacial layer may include phosphorous-doped graphitic carbon nitride and the single ion conducting polymer at a mass ratio in a range of about 5:5 to 9:1.

The interfacial layer may have a thickness in a range of about 1 μm to 10 μm.

A lithium secondary battery according to an embodiment of the present disclosure may include a cathode, the anode, a separator interposed between the cathode and the anode, and an electrolyte impregnated in the separator, wherein the interfacial layer may be interposed between the separator and the anode.

The electrolyte may include 1,1,2,2-tetrafluoroethyl 2,2,2-trifluoroethyl ether (TFTFE).

A method for manufacturing a lithium secondary battery according to an embodiment of the present disclosure may include: preparing starting materials including a carbon nitride precursor compound and a phosphorous precursor compound; reacting the starting materials to prepare phosphorous-doped graphitic carbon nitride, preparing a solution including the phosphorous-doped graphitic carbon nitride and a single ion conducting polymer represented by Chemical Formula 1 above; applying the solution onto a lithium metal layer to form an interfacial layer; manufacturing an electrode assembly in which the interfacial layer-formed lithium metal layer, a separator, and a cathode are sequentially laminated; and injecting an electrolyte into the electrode assembly.

The starting materials may include an amount of about 70% by weight to 95% by weight of the carbon nitride precursor compound and an amount of about 5% by weight to 30% by weight of the phosphorous precursor compound.

The carbon nitride precursor compound may include melamine, dicyanamide, urea, or any combination thereof.

The phosphorous precursor compound may include hexachlorotriphosphazene, aminoethylphosphonic acid, phosphoric acid, or any combination thereof.

The act of preparing the phosphorous-doped graphitic carbon nitride may include: injecting the starting materials into an alcohol-based solvent and mixing them with a ball mill to obtain a mixture; drying the mixture; and heat-treating a dried resultant product.

The solution may be prepared by injecting the phosphorous-doped graphitic carbon nitride, a monomer of the single ion conducting polymer represented by Chemical Formula 2 below, and a crosslinking agent into 1,2-dimethoxyethane (DME).

[Chemical Formula 2]

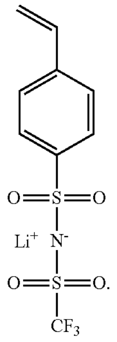

The phosphorous-doped graphitic carbon nitride and the single ion conducting polymer may have a mass ratio in a range of about 5:5 to 9:1.

The solution may have a solid content in a range of about 20% by weight to 25% by weight of the solution.

According to the present disclosure, since, during charging of the battery, lithium uniformly forms nuclei and grows in the plane direction rather than the thickness direction, the growth of dendrites and consumption of the electrolyte can be effectively prevented.

According to the present disclosure, a lithium secondary battery having an increased cycle life can be obtained.

The effects of the present disclosure are not limited to the above-mentioned effects. It should be understood that the effects of the present disclosure include all effects that can be inferred from the following description.

BRIEF DESCRIPTION OF THE DRAWINGS

In order that the disclosure may be well understood, there will now be described various forms thereof, given by way of example, reference being made to the accompanying drawings, in which.

Figure 1:
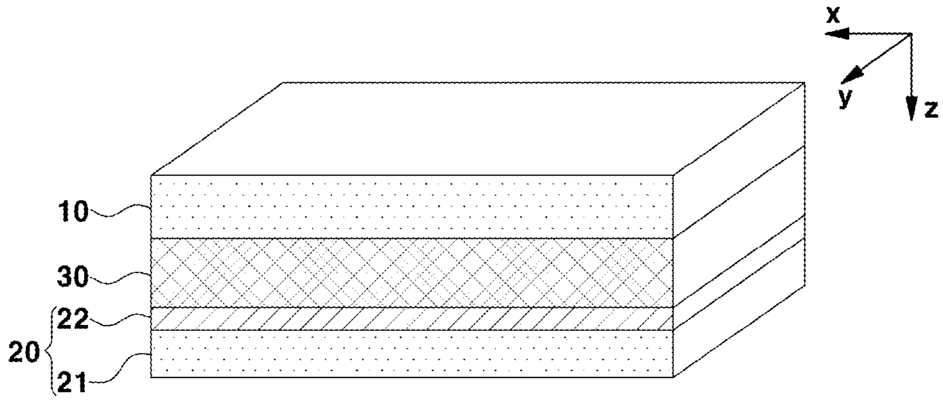
FIG. 1 illustrates a lithium secondary battery according to the present disclosure.

The drawings described herein are for illustration purposes only and are not intended to limit the scope of the present disclosure in any way.

DETAILED DESCRIPTION

The above objects, other objects, features, and advantages of the present disclosure are understood through the following embodiments related to the accompanying drawings. The present disclosure is not limited to the embodiments described herein and may be embodied in other forms. Rather, the embodiments introduced herein are provided so that the disclosed content may become thorough and complete, and the spirit of the present disclosure may be sufficiently conveyed to those skilled in the art.

The similar reference numerals have been used for similar elements while explaining each drawing. In the accompanying drawings, the dimensions of the structures are illustrated after being enlarged than the actual dimensions for clarity of the present disclosure. Terms such as first, second, etc. may be used to describe various components, but the components should not be limited by the terms. The terms are used only for the purpose of distinguishing one component from another component. For example, a first component may be referred to as a second component, and similarly, the second component may also be referred to as the first component, without departing from the scope of rights of the present disclosure. The singular expression includes the plural expression unless the context clearly dictates otherwise.

In the present specification, terms such as "comprise", "have", etc. are intended to designate that a feature, number, act, operation, component, part, or a combination thereof described in the specification exists, but it should be understood that the terms do not preclude the possibility of the existence or addition of one or more other features, numbers, acts, operations, components, parts, or combinations thereof. Further, when a part of a layer, film, region, plate, etc. is said to be "on" other part, this includes not only the case where it is "directly on" the other part but also the case where there is another part in the middle thereof. Conversely, when a part of a layer, film, region, plate, etc. is said to be "under" other part, this includes not only the case where it is "directly under" the other part, but also the case where there is another part in the middle thereof.

Unless otherwise specified, because all numbers, values, and/or expressions expressing quantities of components, reaction conditions, polymer compositions and formulations used in the present specification are approximate values reflecting various uncertainties of the measurement that arise in obtaining these values among others in which these numbers are different, they should be understood as being modified by the term "about" in all cases. Further, when a numerical range is disclosed in this description, such a range is continuous, and includes all values from a minimum value of such a range to a maximum value including the maximum value, unless otherwise indicated. Furthermore, when such a range refers to an integer, all integers including from a minimum value to a maximum value including the maximum value are included, unless otherwise indicated.

FIG. 1 schematically shows a lithium secondary battery according to the present disclosure. Referring to this, the lithium secondary battery may include a cathode 10, an anode 20, a separator 30 interposed between the cathode 10 and the anode 20, and an electrolyte (not shown) impregnated in the separator.

Hereinafter, each configuration of the lithium secondary battery are described in detail.

Cathode

The cathode 10 may include a cathode active material, a binder, a conductive material, and the like.

The cathode active material may include lithium cobalt oxide, lithium nickel cobalt manganese oxide, lithium nickel cobalt aluminum oxide, lithium iron phosphorous oxide, lithium manganese oxide, or any combination thereof. However, the cathode active material is not limited thereto, and any cathode active material available in the art may be used.

The binder assists in bonding between the cathode active material and the conductive material or the like and bonding to the current collector, and may include polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene terpolymer (EPDM), sulfonated EPDM, styrene butadiene rubber, fluoro rubber, various copolymers, or any combination thereof.

The conductive material is not particularly limited as long as the conductive material has conductivity without causing a chemical change in the concerned battery. For example, the conductive material may include: graphite such as natural graphite or artificial graphite; carbon-based materials such as carbon black, acetylene black, Ketjen black, channel black, furnace black, lamp black, and summer black; conductive fibers such as carbon fibers and metal fibers; metal powders such as carbon fluoride, aluminum, and nickel powder; conductive whiskers such as zinc oxide and potassium titanate; conductive metal oxides such as titanium oxide; or conductive materials such as polyphenylene derivatives.

Anode

The anode 20 may include a lithium metal layer 21 and an interfacial layer 22 disposed on the lithium metal layer 21.

The lithium metal layer 21 may include lithium metal or a lithium metal alloy.

The lithium metal alloy may include an alloy of lithium and a metal or metalloid capable of alloying with lithium.

The metal or metalloid capable of alloying with lithium may include silicon (Si), tin (Sn), aluminum (Al), germanium (Ge), lead (Pb), bismuth (Bi), antimony (Sb), or the like.

Lithium metal has a large electric capacity per unit weight, which is advantageous for realization of high-capacity batteries. However, lithium metal may cause a short circuit between the cathode 10 and the anode 20 due to the growth of lithium dendrites during the electrodeposition and dissolution processes of the lithium ions. Further, lithium metal has a high reactivity with the electrolyte so that the lifespan of the battery may be reduced due to a side reaction therebetween. Meanwhile, because lithium metal has a large volume change during the charging/discharging process, lithium desorption may occur from the anode 20 due to this.

Accordingly, the present disclosure has prevented the problem as described above by positioning the interfacial layer 22 capable of inducing lithium to grow in the plane direction by strongly interacting with lithium ions between the lithium metal layer 21 and the separator 30.

In the present specification, "interaction" not only means the electrostatic attraction between phosphorous-doped graphitic carbon nitride of the interfacial layer 22 and lithium element, but also means that the phosphorous-doped graphitic carbon nitride and the adsorbed atoms (adatoms) of the lithium element electrodeposited on the surface of the lithium metal layer 21 form an orbital hybridization. This is described below in more detail.

Further, in the present specification, growth of lithium in the "plane direction" means that lithium grows in the x-y plane based on the coordinate system of FIG. 1.

The interfacial layer 22 may contain phosphorous-doped graphitic carbon nitride and a single ion conducting polymer.

The present disclosure is characterized in that not a general graphitic carbon nitride, but phosphorous-doped graphitic carbon nitride is used as a component of the interfacial layer 22.

The phosphorous-doped graphitic carbon nitride may be represented by Chemical Formula 3 below.

[Chemical Formula 3]

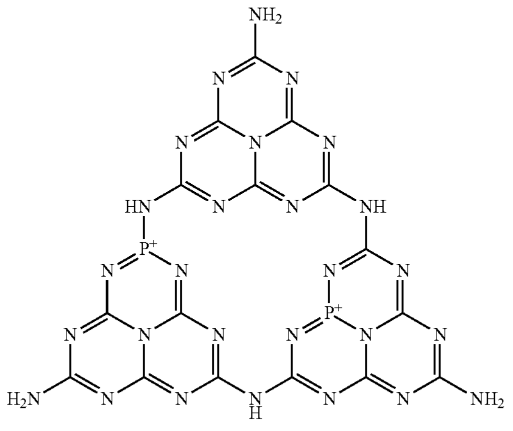

In the present specification, "doping" means that phosphorous element (P) is inserted into the chemical structure of graphitic carbon nitride to form a compound, and specifically, it means that a part of carbon element© constituting graphitic carbon nitride is substituted with phosphorous element (P).

The phosphorous-doped graphitic carbon nitride may have an element concentration of phosphorous element (P) in a range of about 0.1% by atom to 10% by atom.

The phosphorous-doped graphitic carbon nitride includes phosphorous element having a lower electronegativity than carbon element. Therefore, electrons are concentrated to nitrogen element with high electronegativity in the phosphorous-doped graphitic carbon nitride, and thus, the energy of electrons is further strengthened compared to general graphitic carbon nitride. Therefore, the interfacial layer 22 according to the present disclosure may have a stronger interaction with lithium ions.

Further, because the phosphorous element in the phosphorous-doped graphitic carbon nitride has 5 outermost electrons, there is an unshared electron pair remaining even after bonding with the surrounding nitrogen element. Therefore, the adsorbed atoms (adatoms) of lithium ions that pass through the interfacial layer 22 and are electrodeposited on the surface of the lithium metal layer 21 and the unshared electron pair of the phosphorous element form an orbital hybridization and strongly interact. Therefore, the adsorbed atoms (adatoms) of lithium ions try to grow in a direction that they can interact as much as possible with the phosphorous-doped graphitic carbon nitride of the interfacial layer 22. That is, a tendency of lithium to grow in the plane direction increases in the anode according to the present disclosure.

The single ion conducting polymer (SICP) may refer to a compound having anions with extremely limited or fixed mobility in a polymer matrix and lithium cations that are relatively free to move. The single ion conducting polymer has advantages such as electrochemical stability, suppression of concentration polarization phenomenon, and high lithium-ion transport rate.

The present disclosure is characterized in that the single ion conducting polymer is introduced into the interfacial layer 22 to increase the lithium-ion transport rate in the interfacial layer 22 and suppress the decomposition of the electrolyte coordination-bonded to the lithium ions.

The single ion conducting polymer may include a compound represented by Chemical Formula 1 below.

[Chemical Formula 1]

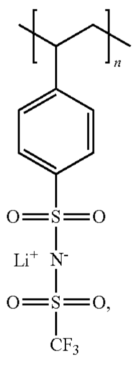

wherein n is an integer in a range of 10 to 100,000.

On the other hand, the present disclosure introduces a lithium fluoride (LiF) forming additive into an electrolyte. Because the lithium fluoride forming additive permeates the single ion conducting polymer well, a LiF-rich solid electrolyte interphase (SEI) with a high lithium fluoride concentration is formed between the interfacial layer 22 and the lithium metal layer 21. Because lithium fluoride has low electrical conductivity, decomposition of the electrolyte may be suppressed, and the internal phase of the solid electrolyte may allow interfacial contact with the phosphorous-doped graphitic carbon nitride to be well maintained, thereby contributing to the improvement of the lifespan of the lithium secondary battery.

The interfacial layer may include the phosphorous-doped graphitic carbon nitride and single ion conducting polymer at a mass ratio in a range of 5:5 to 9:1. When the mass ratio of the above two components falls within the above range, the effect of each component may be sufficiently exhibited.

The interfacial layer 22 may have a thickness in a range of about 1 μm to 10 μm. When the thickness of the interfacial layer 22 is the same as above, the above-described effect may be realized without interfering with the movement of lithium ions.

Separator

The separator 30 prevents the cathode 10 and the anode 20 from physically contacting each other.

The separator 30 may include porous polymer films commonly used in the art to which the present disclosure pertains. For example, the separator may include porous polymer films manufactured of polyolefin-based polymers such as ethylene homopolymer, propylene homopolymer, ethylene/butene copolymer, ethylene/hexene copolymer, and ethylene/methacrylate copolymer alone, or laminates thereof. Meanwhile, the separator 30 may include conventional porous nonwoven fabrics, for example, nonwoven fabrics made of a high melting point glass fiber, a polyethylene terephthalate fiber, and the like, but the present disclosure is not limited thereto.

Electrolyte

The electrolyte is interposed between the cathode 10 and the lithium electrode 20 and is in charge of the movement of lithium ions. The electrolyte may include a lithium salt, an organic solvent, a lithium fluoride forming additive, and the like.

The electrolyte may be fully or partially impregnated in the cathode 10 and the separator 30.

The lithium salt is not particularly limited but may include lithium bis(trifluoromethanesulfonyl)imide (LiTFSI), lithium bis(fluorosulfonyl)imide (LIFSI), or a combination thereof.

The concentration of the lithium salt is also not limited, but may be controlled within a range of about 0.1 to 5.0 M. In this range, the electrolyte may have appropriate conductivity and viscosity, and lithium ions may effectively move within the lithium secondary battery of the embodiment. However, this is only an example, and the present disclosure is not limited thereto.

The organic solvent may include ethylene carbonate (EC), dimethyl carbonate (DMC), 1,3-dioxolane (DOL), dimethoxy ethane (DME), or any combination thereof.

The lithium fluoride forming additive may include 1,1,2,2-tetrafluoroethyl 2,2,2-trifluoroethyl ether (TFTFE).

The method for manufacturing a lithium secondary battery according to the present disclosure may include: preparing starting materials including a carbon nitride precursor compound and a phosphorous precursor compound; reacting the starting materials to prepare phosphorous-doped graphitic carbon nitride; preparing a solution including the phosphorous-doped graphitic carbon nitride and a single ion conducting polymer; applying the solution onto a lithium metal layer to form an interfacial layer; manufacturing an electrode assembly in which the interfacial layer-formed lithium metal layer, a separator, and a cathode are sequentially laminated; and injecting an electrolyte into the electrode assembly.

The carbon nitride precursor compound may include melamine, dicyanamide, urea, or any combination thereof.

The phosphorous precursor compound may include hexachlorotriphosphazene, aminoethylphosphonic acid, phosphoric acid, or any combination thereof.

The starting materials may include an amount of about 70% by weight to 95% by weight of the carbon nitride precursor compound and an amount of about 5% by weight to 30% by weight of the phosphorous precursor compound. When the content of the phosphorous precursor compound exceeds 30% by weight, the content of phosphorous element in the phosphorous-doped graphitic carbon nitride becomes too high, and thus the interfacial layer may be densified.

The act of preparing the phosphorous-doped graphitic carbon nitride may include: injecting the starting materials into an alcohol-based solvent and mixing them with a ball mill to obtain a mixture; drying the mixture; and heat-treating the dried resultant product.

Thereafter, the phosphorous-doped graphitic carbon nitride, a monomer of a single ion conducting polymer represented by Chemical Formula 2 above, and a crosslinking agent may be injected into 1,2-dimethoxyethane (DME) and reacted to prepare a solution.

The phosphorous-doped graphitic carbon nitride and the single ion conducting polymer may have a mass ratio in a range of about 5:5 to 9:1, and the solution may have a solid content in a range of about 20% by weight to 25% by weight of the solution.

A lithium secondary battery may be obtained by combining the anode including the lithium metal layer and the interfacial layer manufactured as described above with a separator and a cathode as shown in FIG. 1 and injecting an electrolyte into the separator.

Hereinafter, the present disclosure is described in detail below with reference to the following Example and Comparative Examples. However, the technical spirit of the present disclosure is not restricted or limited thereto.

Preparation Examples 1 to 3

Melamine and hexachlorotriphosphazene as starting materials were weighed at the ratios of 9.5 g: 0.5 g (Preparation Example 1), 8.5 g: 1.5 g (Preparation Example 2), and 7.0 g: 3.0 g (Preparation Example 3) respectively to inject the weighed starting materials into 80 ml of ethanol. The resultant products were uniformly mixed for about 24 hours using a zirconia ball mill. Thereafter, the mixtures were dried at 60° C. for 24 hours and heat-treated at 550° C. for 4 hours to obtain phosphorous-doped graphitic carbon nitrides. The synthesized materials were named PCN5 (Preparation Example 1), PCN15 (Preparation Example 2), and PCN30 (Preparation Example 3) respectively.

The phosphorous-doped graphitic carbon nitrides of Preparation Examples 1 to 3 were analyzed by Energy Dispersive X-ray Spectroscopy (EDS) to measure the concentrations of elements. The results are as shown in Table 1 below.

TABLE 1

| Classification | C [% by atom] | N [% by atom] | O [% by atom] | P [% by atom] | (C + P)/N [% by atom] |
|---|---|---|---|---|---|
| Preparation Example 1 (PCN5) | 33.75 | 60.34 | 5.43 | 0.42 | 0.566 |
| Preparation Example 2 (PCN15) | 33.27 | 59.18 | 5.63 | 1.85 | 0.593 |
| Preparation Example 3 (PCN30) | 31.38 | 55.12 | 6.27 | 7.10 | 0.698 |

Referring to this, it can be seen that the injection amount of the phosphorous precursor compound and the concentration of phosphorous element in the phosphorous-doped graphitic carbon nitride increase in proportion. Further, it can be seen from the (C+P)/N values that the resultant product of each Preparation Example maintains the structure of graphitic carbon nitride.

Figure 2:
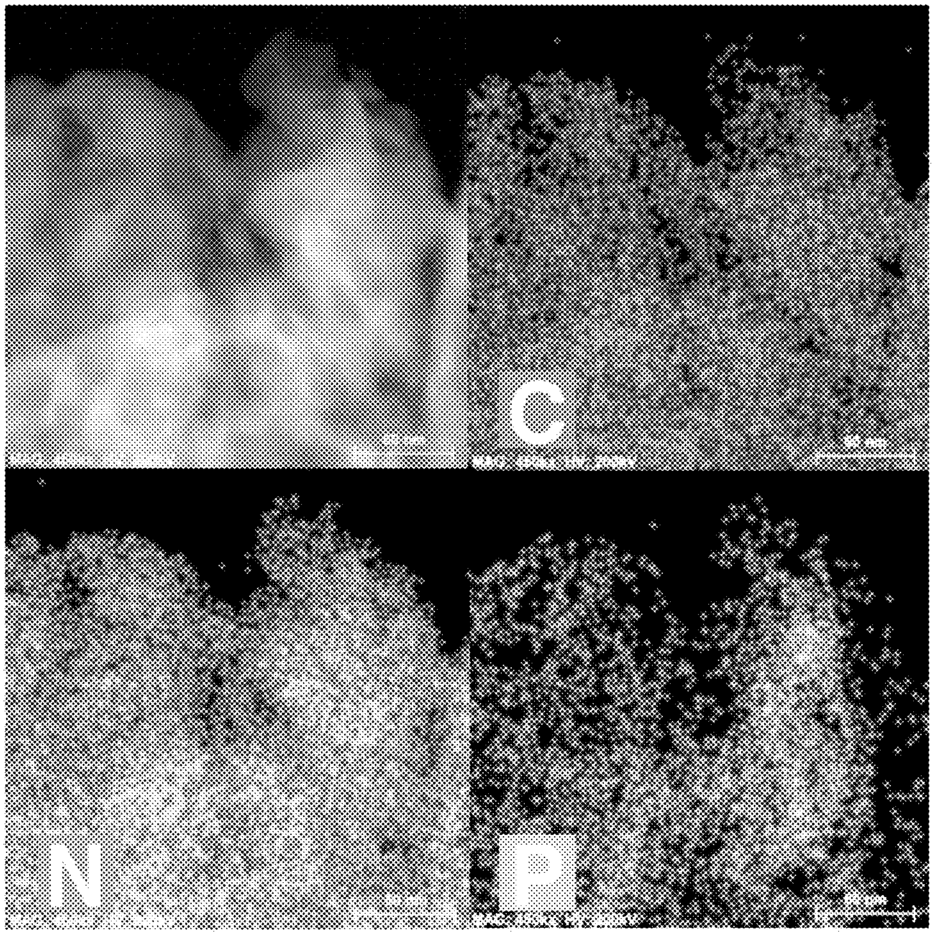
FIG. 2 is mapping results of phosphorous-doped graphitic carbon nitride according to Preparation Example 3 by energy dispersive X-ray spectroscopy in scanning transmission electron microscopy (STEM-EDS)

Meanwhile, FIG. 2 is mapping results of the phosphorous-doped graphitic carbon nitride according to Preparation Example 3 by energy dispersive X-ray spectroscopy in scanning transmission electron microscopy (STEM-EDS). Referring to this, it can be seen that the phosphorous element is uniformly distributed in the phosphorous-doped graphitic carbon nitride.

Example

Figure 3:
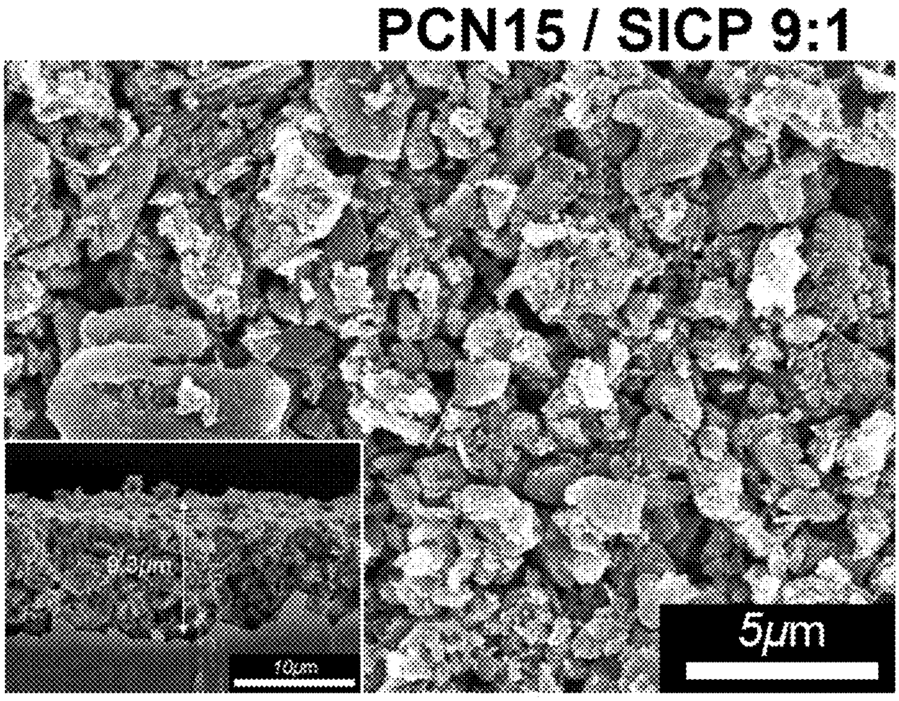
FIG. 3 is a result of analyzing an anode according to an Example with a scanning electron microscope.

The phosphorous-doped graphitic carbon nitride according to Preparation Example 2 (PCN15) and lithium 4-styrenesulfonyl-(trifluoromethane sulfonyl)imide, the monomer of the single ion conducting polymer, were mixed at a mass ratio of 9:1 and injected into 1,2-dimethoxyethane (DME), a solvent. The resultant product was stirred for about 12 hours or more, and 1% by mass of poly(ethylene glycol)diacrylate (PEGDA) was injected thereinto as a crosslinking agent. The resultant product was stirred for 5 minutes or more to obtain a solution. The solution was applied to the surface of lithium metal by bar-coating. The coated lithium metal was dried at 60° C. for 12 hours, and polymer polymerization proceeded to form an interfacial layer. The interfacial layer had a thickness of about 8 μm to 9 μm. FIG. 3 is a result of analyzing the anode according to an Example with a scanning electron microscope.

Comparative Example 1

Figure 4:
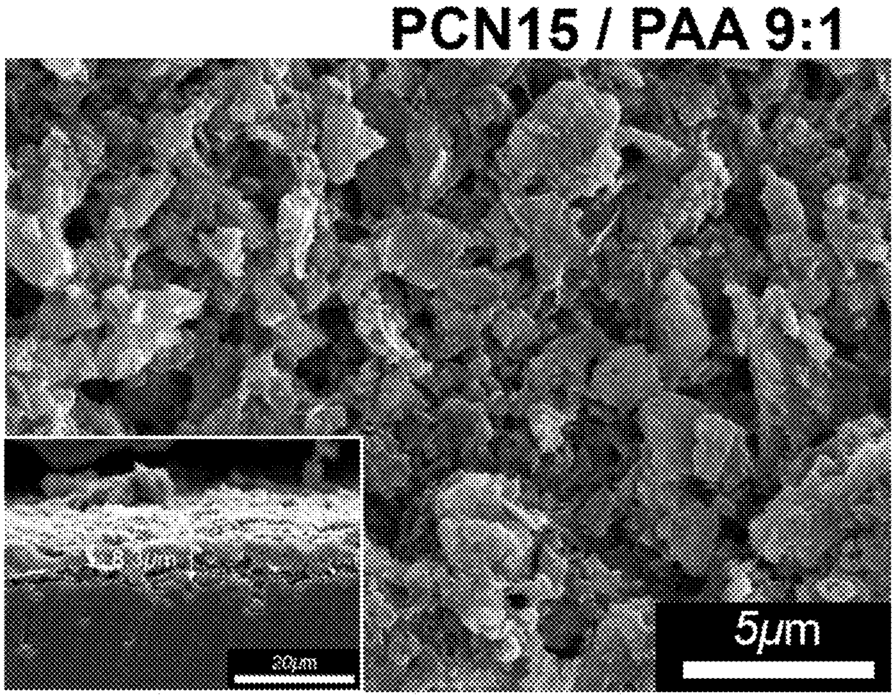
FIG. 4 is a result of analyzing an anode according to a Comparative Example with a scanning electron microscope.

After phosphorous-doped graphitic carbon nitride was mixed with poly(acrylic acid) instead of a single ion conducting polymer at a mass ratio of 9:1, and the mixture was stirred under an N-methyl-2-pyrrolidone (NMP) solvent for 12 hours or more, the stirred mixture was applied to the lithium metal surface. The coated lithium metal was dried at 60° C. for 12 hours to form an interfacial layer. FIG. 4 is a result of analyzing the anode according to a Comparative Example with a scanning electron microscope.

Comparative Example 2

A lithium metal layer on which the interfacial layer was not formed was set as an anode according to Comparative Example 2.

Experimental Example 1—Evaluation of Performance Change according to Electrolyte Symmetrical cells were prepared in which a separator and a lithium metal having a thickness of about 40 μm were sequentially laminated on the anode according to the Example. About 100 μL of an electrolyte having the following components was injected into the separator.

1 M LiTFSI EC/DMC 1:1(V/V)+10% by weight of FEC+0.2 M LiBOB 2.5 M LiFSI DME/TFOFE 8:2(V/V)+0.3% by weight of $LiPO_2F_2$ (3 M LiFSI DME)/TFTFE 1:1 (V/V)

Each symmetrical cell was charged and discharged to an area capacity of 3 mAh $cm^{-2}$ at a current density of 3 mA $cm^{-2}$.

Figure 5A:
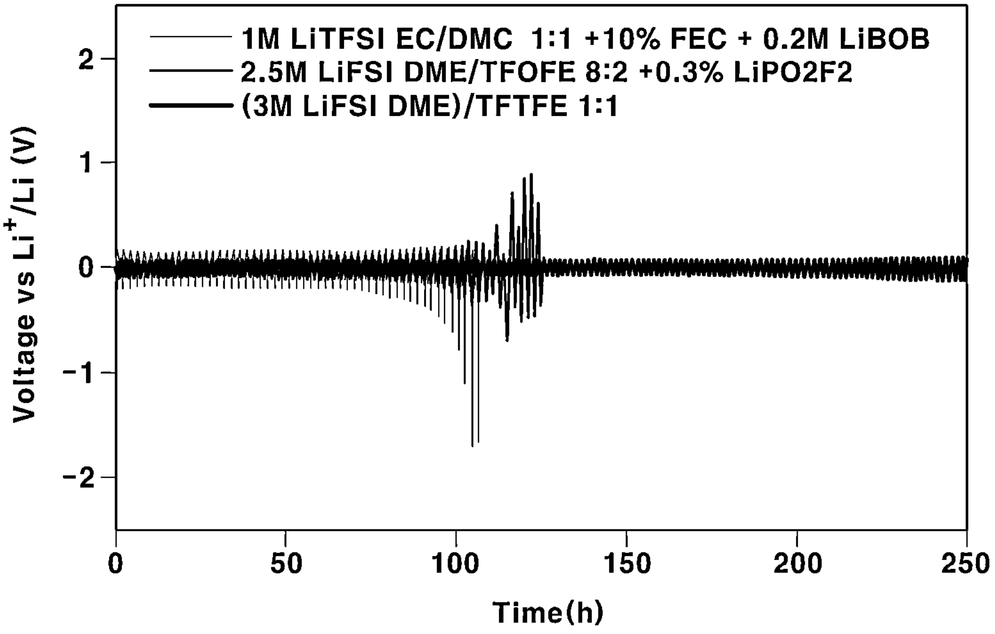
FIG. 5A is results of measuring the lifespan of each symmetrical cell in Experimental Example 1.

FIG. 5A is results of measuring the lifespan of each symmetrical cell. Referring to this, it can be seen that the electrolyte to which 10% by weight of FEC is added shows a lifespan of 50 cycles, and the electrolyte to which about 20% by volume of TFOFE is added shows a lifespan of 60 cycles, whereas the electrolyte to which about 50% by volume of TFTFE, a lithium fluoride forming additive, is added has a lifespan of about 150 cycles, which is the longest lifespan.

Figure 5B:
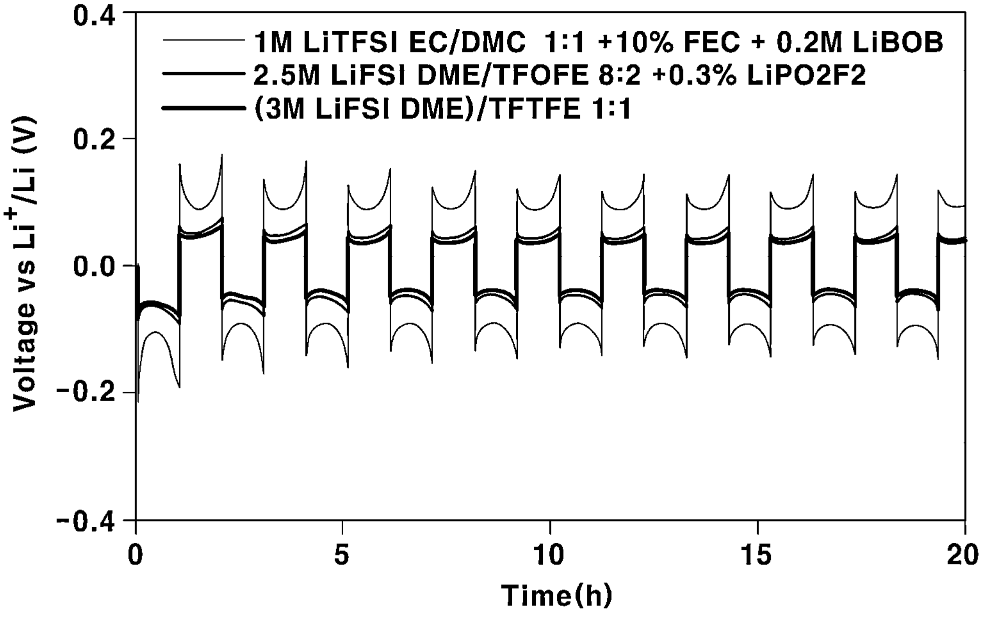
FIG. 5B is results of measuring the initial overvoltage of each symmetrical cell in Experimental Example 1.

FIG. 5B is results of measuring the initial overvoltage of each symmetrical cell. It can be seen that the electrolyte in which TFTFE, a lithium fluoride forming additive, is added in an amount of about 50% by volume shows a very low overvoltage.

Experimental Example 2—Performance Evaluation under Microelectrolyte Conditions Symmetrical cells in which a separator and a lithium metal having a thickness of about 40 μm were sequentially laminated on the anodes according to the Example and Comparative Example 1 were prepared. About 10.2 μl of (3 M LiFSI DME)/TFTFE 1:1 (V/V) as an electrolyte was injected into the separator.

Figure 6A:
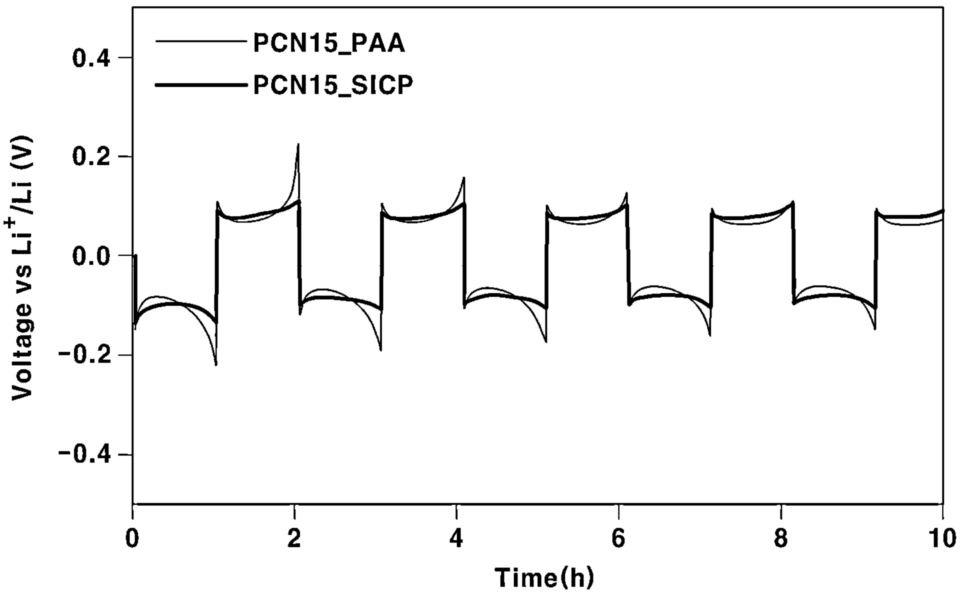
FIG. 6A is results of measuring the overvoltages of Example (PCN15_SICP) and Comparative Example 1 (PCN15_PAA)

FIG. 6A is results of measuring the overvoltages of Example (PCN15_SICP) and Comparative Example 1 (PCN15_PAA). Referring to this, the size of a peak indicating energy entering lithium nucleation and lithium desorption is small in the Example compared to Comparative Examples. This means that the electrodeposition and dissolution reversibility of lithium was improved.

Figure 6B:
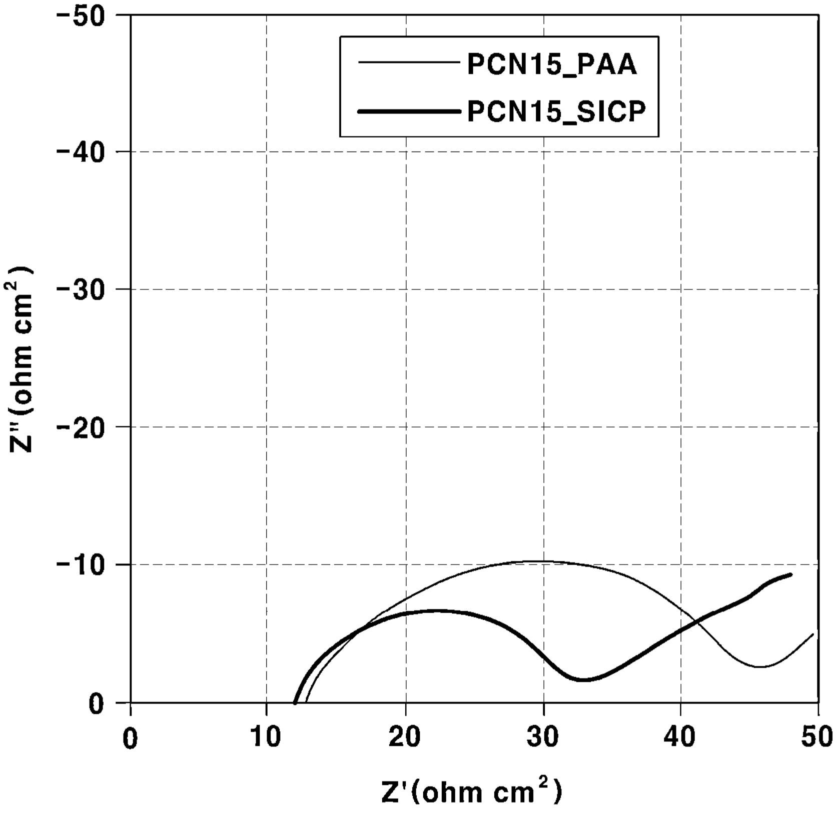
FIG. 6B is results of measuring the impedances of Example (PCN15_SICP) and Comparative Example 1 (PCN15_PAA)

FIG. 6B is results of measuring the impedances of Example (PCN15_SICP) and Comparative Example 1 (PCN15_PAA). Referring to this, it can be seen that the interfacial resistance of the Example was reduced compared to that of Comparative Example 1.

Experimental Example 3—Evaluation of Electrolyte Decomposition Inhibition Ability Symmetrical cells in which a separator and a lithium metal having a thickness of about 40 μm were sequentially laminated on the anodes according to the Example and Comparative Examples 1 and 2 were prepared. About 10.2 μl of (3 M LiFSI DME)/TFTFE 1:1 (V/V) as an electrolyte was injected into the separator.

Figure 7A:
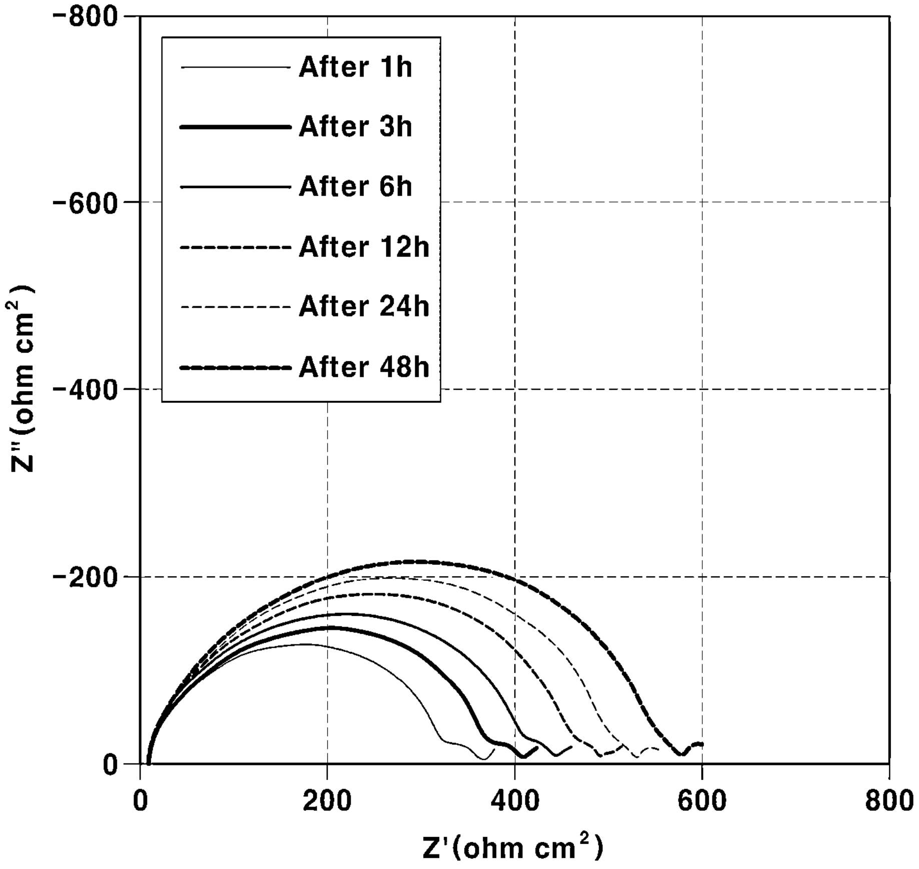
FIG. 7A is impedance test results according to time of Example (PCN15_SICP)
Figure 7B:
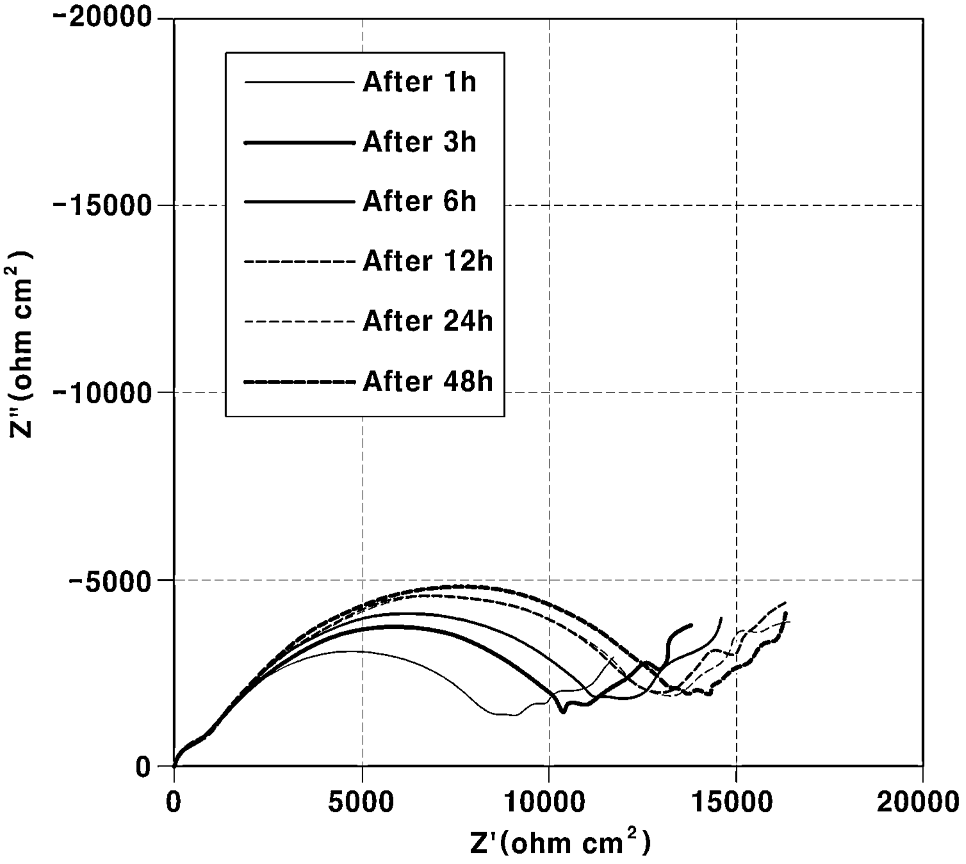
FIG. 7B is impedance test results according to time of Comparative Example 1 (PCN15_PAA)
Figure 7C:
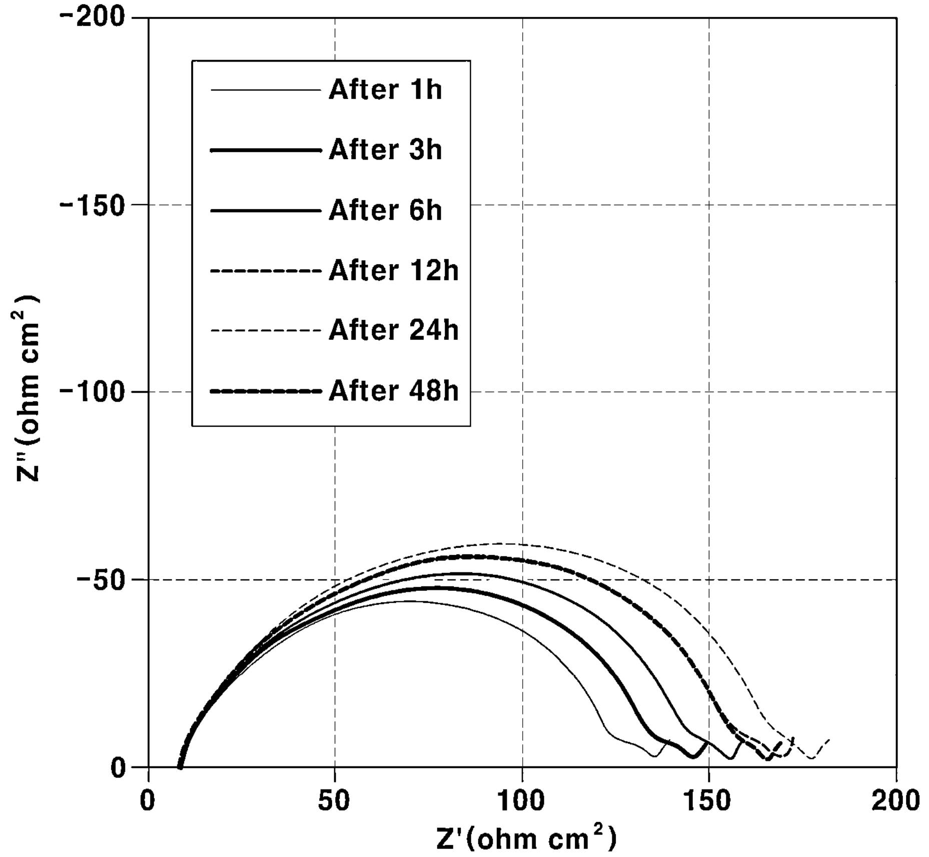
FIG. 7C is impedance test results according to time of Comparative Example 2 (Bare)

FIG. 7A is impedance test results according to time of the Example (PCN15_SICP). FIG. 7B is impedance test results according to time of Comparative Example 1 (PCN15_PAA). FIG. 7C is impedance test results according to time of Comparative Example 2 (Bare). Referring to this, the Example has a small initial interface resistance value compared to Comparative Example 2 and maintains the smallest value even after 48 hours. This may be seen as a meaning that the increase in the thickness and resistance of the solid electrolyte interphase (SEI) through chemical electrolyte decomposition is suppressed.

Figure 8:
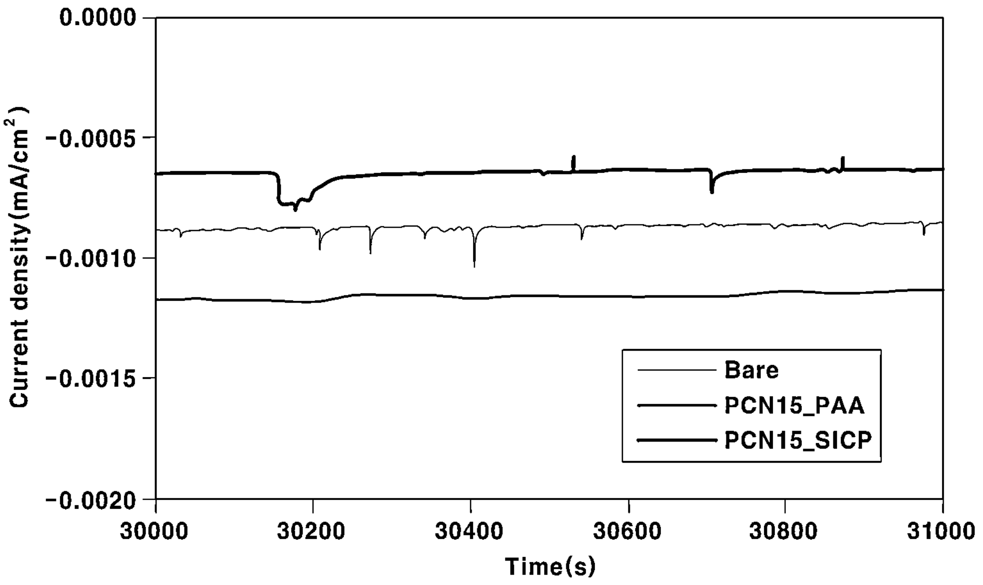
FIG. 8 is results of measuring the electrolyte decomposition currents thereof after manufacturing Li/SUS cells using anodes according to Example, Comparative Example 1, and Comparative Example 2.

Li/SUS cells were manufactured using the anodes according to the Example, and Comparative Examples 1 and 2, and the electrolyte decomposition currents thereof were measured. Specifically, confirmed was after a constant voltage was applied as 0 V in the Li/SUS cells and the flowing electrolyte decomposition current reached a steady-state. The results are as shown in FIG. 8. Referring to this, the Example (PCN15_SICP) shows an electrolyte decomposition current value much lower than those of Comparative Example 1 (PCN15_PAA) and Comparative Example 2 (Bare). This means that the passivation ability of the solid electrolyte interphase (SEI) of the Example is good.

Experimental Example 4—Lithium-Ion Transport Rate Measurement

Symmetrical cells in which a separator and a lithium metal having a thickness of about 40 μm were sequentially laminated on the anodes according to Example and Comparative Examples 1 and 2 were prepared. About 10.2 μl of (3 M LiFSI DME)/TFTFE 1:1 (V/V) as an electrolyte was injected into the separator.

Figure 9:
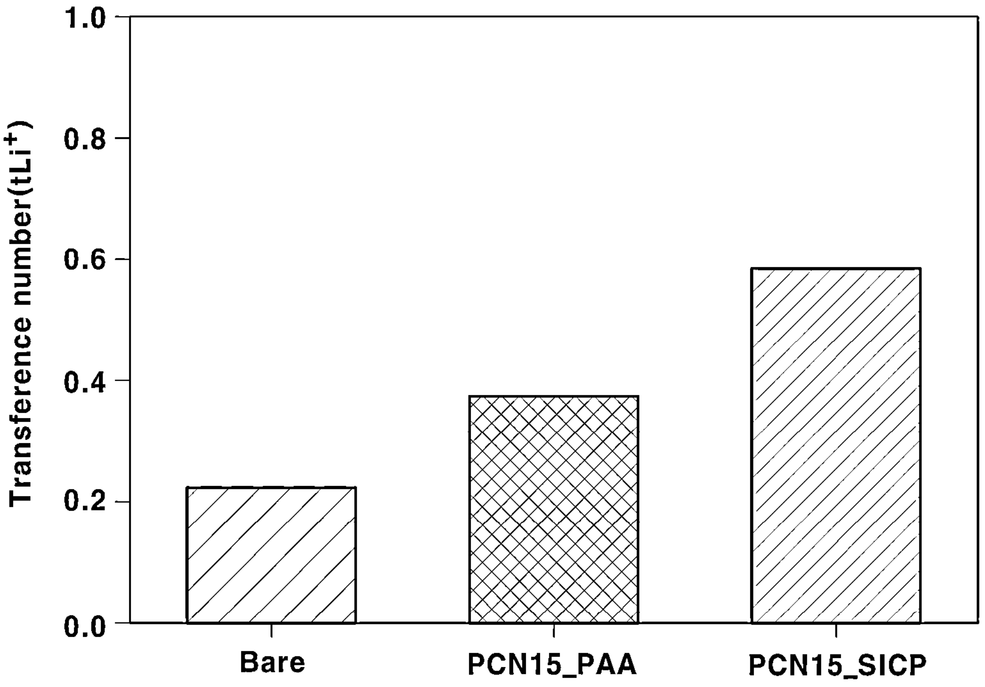
FIG. 9 is results of calculating the lithium-ion transport rates using the Bruce-Vincent method through changes in the voltage curve and impedance after applying a certain voltage to each symmetrical cell in Experimental Example 4.

After applying a constant voltage to each symmetrical cell, the lithium-ion transport rate was calculated using the Bruce-Vincent method through changes in the voltage curve and impedance. The results are as shown in FIG. 9. Referring to this, the Example (PCN15_SICP) shows a high transference number value compared to Comparative Example 1 (PCN15_PAA) and Comparative Example 2 (Bare). This is because, in the case of the Example, there are single ion conducting properties that block the movement of anions and permeate lithium ions.

As a result, it can be expected that the Example suppresses dendrite growth best by the following Sand's time equation.

[Sand's time equation]

$$\tau = \pi D \frac{eC_0(\mu_a + \mu_{Li^+})^2}{2J\mu_a}$$

$\tau$ = time when Li dendrites start to grow $D$ = diffusion coefficient $E$ = electronic charge $C_0$ = initial concentration of salt $\mu_a$ = anionic mobility $J$ = local current density $\mu_{Li^+}$ = Li mobility Although the embodiments have been described with reference to the limited Examples and drawings as described above, various modifications and variations are possible from the above description by one of ordinary skill in the art. For example, appropriate results can be achieved although described techniques are performed in order different from a described method, and/or described elements are joined or combined in a form different from the described method or replaced or substituted by other elements or equivalents. Therefore, other embodiments, other Examples, and equivalents to the scope of claims also belong to the scope of the claims to be described later.

What is claimed is:

1. An anode for a lithium secondary battery, the anode comprising:

a lithium metal layer; and an interfacial layer disposed on the lithium metal layer, wherein the interfacial layer comprises phosphorous-doped graphitic carbon nitride and a single ion conducting polymer represented by Chemical Formula 1:

[Chemical Formula 1]

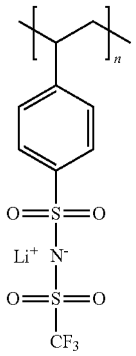

wherein n is an integer in a range of 10 to 100,000, and wherein the interfacial layer comprises phosphorous-doped graphitic carbon nitride and the single ion conducting polymer at a mass ratio in a range of 5: 5 to 9:1.

2. The anode of claim 1, wherein the phosphorous-doped graphitic carbon nitride has an element concentration of phosphorous element (P) in a range of 0.1% by atom to 10% by atom.

3. The anode of claim 1, wherein a thickness of the interfacial layer is in a range of 1 μm to 10 μm.

4. A lithium secondary battery comprising:

a cathode;

an anode comprising a lithium metal layer and an interfacial layer disposed on the lithium metal layer;

a separator interposed between the cathode and the anode; and an electrolyte impregnated in the separator, wherein the interfacial layer is interposed between the separator and the lithium metal layer of the anode, and wherein the interfacial layer comprises phosphorous-doped graphitic carbon nitride and a single ion conducting polymer represented by Chemical Formula 1:

[Chemical Formula 1]

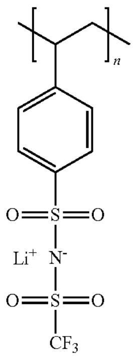

wherein n is an integer in a range of 10 to 100,000, and wherein the interfacial layer comprises phosphorous-doped graphitic carbon nitride and the single ion conducting polymer at a mass ratio in a range of 5:5 to 9:1.

5. The lithium secondary battery of claim 4, wherein the electrolyte comprises 1,1,2,2-tetrafluoroethyl 2,2,2-trifluoroethyl ether (TFTFE).

* * * * *